(12) United States Patent
Pursifull et al.

(10) Patent No.: US 8,312,867 B2
(45) Date of Patent: Nov. 20, 2012

(54) ON-BOARD FUEL VAPOR SEPARATION FOR MULTI-FUEL VEHICLE

(75) Inventors: Ross Dykstra Pursifull, Dearborn, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/398,754

(22) Filed: Feb. 16, 2012

(65) Prior Publication Data

US 2012/0152211 A1 Jun. 21, 2012

Related U.S. Application Data

(62) Division of application No. 11/955,246, filed on Dec. 12, 2007, now Pat. No. 8,118,009.

(51) Int. Cl.
*F02M 1/00* (2006.01)
(52) U.S. Cl. ........................ 123/516; 123/519
(58) Field of Classification Search .................. 123/510, 123/515–520
See application file for complete search history.

(56) References Cited

U.S. PATENT DOCUMENTS

| | | | |
|---|---|---|---|
| 2,101,554 A | 12/1937 | Meyer | |
| 2,221,405 A | 11/1940 | Nallinger | |
| 3,589,348 A | 6/1971 | Reichhelm | |
| 3,794,000 A | 2/1974 | Hodgkinson | |
| 3,826,234 A | 7/1974 | Cinquegrani | |
| 4,031,864 A | 6/1977 | Crothers | |
| 4,122,803 A | 10/1978 | Miller | |
| 4,136,652 A | 1/1979 | Lee | |
| 4,205,650 A | 6/1980 | Szwarchiber | |
| 4,210,103 A | 7/1980 | Dimitroff et al. | |
| 4,256,075 A | 3/1981 | Fukui et al. | |
| 4,311,118 A | 1/1982 | Slagle | |
| 4,325,329 A | 4/1982 | Taylor | |
| 4,331,121 A | 5/1982 | Stokes | |
| 4,385,593 A | 5/1983 | Brooks | |
| 4,402,296 A | 9/1983 | Schwarz | |

(Continued)

FOREIGN PATENT DOCUMENTS

CN 1536203 A 10/2004

(Continued)

OTHER PUBLICATIONS

U.S. Appl. No. 60/790,715, filed Apr. 10, 2006, Bromberg et al.

(Continued)

*Primary Examiner* — John Kwon
(74) *Attorney, Agent, or Firm* — Julia Voutyras; Alleman Hall McCoy Russell & Tuttle LLP

(57) ABSTRACT

A fuel delivery system for a fuel burning engine of a vehicle and a method of operating the fuel delivery system is provided. As one example, the method includes separating a first fuel and a second fuel from a fuel vapor on-board the vehicle, said fuel vapor including at least an alcohol component and a hydrocarbon component and said first fuel including a higher concentration of the alcohol component than the fuel vapor and the second fuel; condensing the separated first fuel from a vapor phase to a liquid phase; delivering the condensed liquid phase of the first fuel to the engine; and combusting at least the condensed liquid phase of the first fuel at the engine.

6 Claims, 9 Drawing Sheets

U.S. PATENT DOCUMENTS

| | | | |
|---|---|---|---|
| 4,411,243 A | 10/1983 | Hardenberg et al. |
| 4,459,930 A | 7/1984 | Flory |
| 4,480,616 A | 11/1984 | Takeda |
| 4,489,596 A | 12/1984 | Linder et al. |
| 4,499,885 A | 2/1985 | Weissenbach et al. |
| 4,502,453 A | 3/1985 | Kabasin et al. |
| 4,519,341 A | 5/1985 | McGarr |
| 4,541,383 A | 9/1985 | Jessel |
| 4,558,665 A | 12/1985 | Sandberg et al. |
| 4,590,904 A | 5/1986 | Wannenwetsch |
| 4,648,367 A | 3/1987 | Gillbrand et al. |
| 4,664,091 A | 5/1987 | Royer |
| 4,706,630 A | 11/1987 | Wineland et al. |
| 4,810,929 A | 3/1989 | Strumbos |
| 4,817,576 A | 4/1989 | Abe et al. |
| 4,930,537 A | 6/1990 | Farmer |
| 4,945,881 A | 8/1990 | Gonze et al. |
| 4,962,789 A | 10/1990 | Benscoter |
| 4,993,386 A | 2/1991 | Ozasa et al. |
| 4,993,388 A | 2/1991 | Mitsumoto |
| 4,998,518 A | 3/1991 | Mitsumoto |
| 5,017,826 A | 5/1991 | Oshima et al. |
| 5,018,483 A | 5/1991 | Kashima et al. |
| 5,044,331 A | 9/1991 | Suga et al. |
| 5,044,344 A | 9/1991 | Tuckey et al. |
| 5,050,555 A | 9/1991 | Mitsumoto |
| 5,056,490 A | 10/1991 | Kashima |
| 5,056,494 A | 10/1991 | Kayanuma |
| 5,060,610 A | 10/1991 | Paro |
| 5,097,803 A | 3/1992 | Galvin |
| 5,111,795 A | 5/1992 | Thompson |
| 5,131,228 A | 7/1992 | Mochizuki et al. |
| 5,150,683 A | 9/1992 | Depa et al. |
| 5,174,247 A | 12/1992 | Tosa et al. |
| 5,188,087 A | 2/1993 | Saito |
| 5,193,508 A | 3/1993 | Motoyama et al. |
| 5,204,630 A | 4/1993 | Seitz et al. |
| 5,230,309 A | 7/1993 | Suga et al. |
| 5,233,944 A | 8/1993 | Mochizuki |
| 5,241,933 A | 9/1993 | Morikawa |
| 5,335,637 A | 8/1994 | Davis et al. |
| 5,336,396 A | 8/1994 | Shetley |
| 5,357,908 A | 10/1994 | Sung et al. |
| 5,360,034 A | 11/1994 | Der Manuelian |
| 5,408,979 A | 4/1995 | Backlund et al. |
| 5,417,239 A | 5/1995 | Ford |
| 5,469,830 A | 11/1995 | Gonzalez |
| 5,477,836 A | 12/1995 | Hyodo et al. |
| 5,508,582 A | 4/1996 | Sugimoto et al. |
| 5,515,280 A | 5/1996 | Suzuki |
| 5,560,344 A | 10/1996 | Chan |
| 5,565,157 A | 10/1996 | Sugimoto et al. |
| 5,694,908 A | 12/1997 | Hsu |
| 5,713,336 A | 2/1998 | King et al. |
| 5,722,362 A | 3/1998 | Takano et al. |
| 5,740,784 A | 4/1998 | McKinney |
| 5,782,092 A | 7/1998 | Schultalbers et al. |
| 5,806,500 A | 9/1998 | Fargo et al. |
| 5,875,743 A | 3/1999 | Dickey |
| 5,887,566 A | 3/1999 | Glauber et al. |
| 5,921,222 A | 7/1999 | Freeland |
| 5,979,400 A | 11/1999 | Nishide |
| 6,017,646 A | 1/2000 | Prasad et al. |
| 6,035,837 A | 3/2000 | Cohen et al. |
| 6,042,955 A | 3/2000 | Okamoto |
| 6,112,705 A | 9/2000 | Nakayama et al. |
| 6,112,725 A | 9/2000 | McKinney |
| 6,119,637 A | 9/2000 | Matthews et al. |
| 6,189,516 B1 | 2/2001 | Hei Ma |
| 6,213,086 B1 | 4/2001 | Chmela et al. |
| 6,229,253 B1 | 5/2001 | Iwata et al. |
| 6,234,123 B1 | 5/2001 | Iiyama et al. |
| 6,237,339 B1 | 5/2001 | Asen et al. |
| 6,318,083 B1 | 11/2001 | Machida et al. |
| 6,325,039 B1 | 12/2001 | Goto |
| 6,332,448 B1 | 12/2001 | Ilyama et al. |
| 6,338,336 B1 * | 1/2002 | Iida ............ 123/674 |
| 6,344,246 B1 | 2/2002 | Fischer et al. |
| 6,371,151 B1 | 4/2002 | Saylor |
| 6,382,225 B1 | 5/2002 | Tipton |
| 6,467,470 B1 | 10/2002 | Carlsson et al. |
| 6,494,192 B1 | 12/2002 | Capshaw et al. |
| 6,505,579 B1 | 1/2003 | Lee |
| 6,553,974 B1 | 4/2003 | Wickman et al. |
| 6,617,769 B2 | 9/2003 | Suzuki |
| 6,619,242 B2 | 9/2003 | Kaneko |
| 6,622,663 B2 | 9/2003 | Weissman et al. |
| 6,622,664 B2 | 9/2003 | Holder et al. |
| 6,622,690 B2 | 9/2003 | Ando et al. |
| 6,651,432 B1 | 11/2003 | Gray, Jr. |
| 6,659,068 B2 | 12/2003 | Urushihara et al. |
| 6,681,739 B2 | 1/2004 | Mamiya et al. |
| 6,684,849 B2 | 2/2004 | zur Loye et al. |
| 6,691,669 B2 | 2/2004 | Surnilla et al. |
| 6,698,387 B1 | 3/2004 | McFarland et al. |
| 6,711,893 B2 | 3/2004 | Ueda et al. |
| 6,792,966 B2 | 9/2004 | Harvey |
| 6,805,107 B2 | 10/2004 | Vinyard |
| 6,845,616 B2 | 1/2005 | Jauss |
| 6,866,950 B2 | 3/2005 | Connor et al. |
| 6,928,983 B2 | 8/2005 | Mashiki |
| 6,951,202 B2 | 10/2005 | Oda |
| 6,959,693 B2 | 11/2005 | Oda |
| 6,972,093 B2 | 12/2005 | Partridge et al. |
| 6,978,762 B2 | 12/2005 | Mori |
| 6,988,485 B2 | 1/2006 | Ichise et al. |
| 6,990,956 B2 | 1/2006 | Niimi |
| 7,011,048 B2 | 3/2006 | Gurin et al. |
| 7,013,844 B2 | 3/2006 | Oda |
| 7,021,296 B2 * | 4/2006 | Reddy ............ 123/520 |
| 7,055,500 B2 | 6/2006 | Miyashita et al. |
| 7,082,926 B2 | 8/2006 | Sadakane et al. |
| 7,107,942 B2 | 9/2006 | Weissman et al. |
| 7,114,492 B2 * | 10/2006 | Reddy ............ 123/518 |
| 7,159,568 B1 | 1/2007 | Lewis et al. |
| 7,178,503 B1 | 2/2007 | Brehob |
| 7,225,787 B2 | 6/2007 | Bromberg et al. |
| 7,255,080 B1 | 8/2007 | Leone |
| 7,261,064 B2 | 8/2007 | Bhaisora et al. |
| 7,278,396 B2 | 10/2007 | Leone et al. |
| 7,287,492 B2 | 10/2007 | Leone et al. |
| 7,287,509 B1 | 10/2007 | Brehob |
| 7,293,552 B2 | 11/2007 | Leone et al. |
| 7,302,933 B2 | 12/2007 | Kerns |
| 7,305,975 B2 * | 12/2007 | Reddy ............ 123/520 |
| 7,337,754 B2 | 3/2008 | Dearth et al. |
| 7,350,504 B2 | 4/2008 | Yasunaga et al. |
| 7,357,101 B2 | 4/2008 | Boyarski |
| 7,367,317 B2 | 5/2008 | Miyazaki et al. |
| 7,373,931 B2 | 5/2008 | Lennox et al. |
| 7,389,751 B2 | 6/2008 | Leone |
| 7,395,786 B2 | 7/2008 | Leone et al. |
| 7,406,947 B2 | 8/2008 | Lewis et al. |
| 7,412,966 B2 | 8/2008 | Lewis et al. |
| 7,424,881 B2 | 9/2008 | Kerns |
| 7,426,907 B2 | 9/2008 | Dearth et al. |
| 7,426,908 B2 | 9/2008 | Brehob |
| 7,426,925 B2 | 9/2008 | Leone et al. |
| 7,428,895 B2 | 9/2008 | Leone et al. |
| 7,444,987 B2 | 11/2008 | Cohn et al. |
| 7,448,367 B1 * | 11/2008 | Reddy et al. ............ 123/520 |
| 7,454,285 B2 | 11/2008 | Christie et al. |
| 7,461,628 B2 | 12/2008 | Blumberg et al. |
| 7,487,631 B2 | 2/2009 | Cueman et al. |
| 7,493,879 B2 | 2/2009 | Fujii et al. |
| 7,493,897 B2 | 2/2009 | Arakawa et al. |
| 7,533,651 B2 | 5/2009 | Surnilla |
| 7,556,023 B2 | 7/2009 | Ilhoshi et al. |
| 7,578,281 B2 | 8/2009 | Russell et al. |
| 7,581,528 B2 | 9/2009 | Stein et al. |
| 7,584,740 B2 | 9/2009 | Boyarski |
| 7,594,498 B2 | 9/2009 | Lewis et al. |
| 7,637,250 B2 | 12/2009 | Bromberg et al. |
| 7,640,912 B2 | 1/2010 | Lewis et al. |
| 7,640,913 B2 | 1/2010 | Blumberg et al. |
| 7,640,914 B2 | 1/2010 | Lewis et al. |
| 7,640,915 B2 | 1/2010 | Cohn et al. |

| | | |
|---|---|---|
| 7,647,899 B2 | 1/2010 | Dearth et al. |
| 7,647,916 B2 | 1/2010 | Leone et al. |
| 7,665,428 B2 | 2/2010 | Dearth et al. |
| 7,665,452 B2 | 2/2010 | Russell et al. |
| 7,676,321 B2 | 3/2010 | Andri |
| 7,681,554 B2 | 3/2010 | Stein et al. |
| 7,694,666 B2 | 4/2010 | Lewis et al. |
| 7,703,446 B2 | 4/2010 | Bromberg et al. |
| 7,721,710 B2 | 5/2010 | Leone et al. |
| 7,726,265 B2 | 6/2010 | Bromberg et al. |
| 7,730,872 B2 | 6/2010 | Leone et al. |
| 7,740,009 B2 | 6/2010 | Shelby et al. |
| 7,765,982 B2 | 8/2010 | Lewis et al. |
| 7,779,813 B2 | 8/2010 | Hahn |
| 7,789,063 B2 | 9/2010 | Lewis et al. |
| 7,845,315 B2 | 12/2010 | Leone et al. |
| 7,849,842 B1 | 12/2010 | Lewis et al. |
| 7,869,930 B2 | 1/2011 | Stein et al. |
| 7,877,189 B2 | 1/2011 | Leone |
| 7,886,729 B2 | 2/2011 | Russell et al. |
| 7,900,933 B2 | 3/2011 | Tones et al. |
| 7,909,019 B2 | 3/2011 | Stein |
| 7,913,668 B2 | 3/2011 | Lewis et al. |
| 7,933,713 B2 | 4/2011 | Leone |
| 7,942,128 B2 | 5/2011 | Leone et al. |
| 7,967,899 B2 * | 6/2011 | Aono .............. 96/154 |
| 7,971,567 B2 | 7/2011 | Zubeck et al. |
| 7,971,575 B2 | 7/2011 | Lewis et al. |
| 8,015,951 B2 | 9/2011 | Dearth et al. |
| 8,028,678 B2 | 10/2011 | Stein |
| 8,065,979 B2 | 11/2011 | Leone et al. |
| 8,118,009 B2 * | 2/2012 | Pursifull et al. .............. 123/434 |
| 8,132,555 B2 | 3/2012 | Lewis et al. |
| 2001/0035215 A1 | 11/2001 | Tipton et al. |
| 2002/0139111 A1 | 10/2002 | Ueda et al. |
| 2003/0089337 A1 | 5/2003 | Cohn et al. |
| 2003/0127072 A1 | 7/2003 | Gmelin et al. |
| 2004/0035395 A1 | 2/2004 | Heywood et al. |
| 2004/0065274 A1 | 4/2004 | Cohn et al. |
| 2004/0083717 A1 | 5/2004 | Zhu et al. |
| 2004/0149644 A1 | 8/2004 | Partridge et al. |
| 2004/0250790 A1 | 12/2004 | Heywood et al. |
| 2004/0261763 A1 | 12/2004 | Hashimoto et al. |
| 2005/0051135 A1 | 3/2005 | Tomoda et al. |
| 2005/0066939 A1 | 3/2005 | Shimada et al. |
| 2005/0097888 A1 | 5/2005 | Miyashita |
| 2005/0103285 A1 | 5/2005 | Oda |
| 2005/0109316 A1 | 5/2005 | Oda |
| 2005/0109319 A1 | 5/2005 | Oda |
| 2005/0155577 A1 | 7/2005 | Ichise et al. |
| 2005/0155578 A1 | 7/2005 | Ichise et al. |
| 2005/0166896 A1 | 8/2005 | Sadakane et al. |
| 2005/0172931 A1 | 8/2005 | Mori |
| 2005/0178356 A1 | 8/2005 | Shibagaki |
| 2005/0178360 A1 | 8/2005 | Satou |
| 2005/0183698 A1 | 8/2005 | Yonezawa |
| 2005/0274353 A1 | 12/2005 | Okubo et al. |
| 2006/0016429 A1 | 1/2006 | Mashiki |
| 2006/0075991 A1 | 4/2006 | Heywood et al. |
| 2006/0090732 A1 | 5/2006 | Shibagaki |
| 2006/0102136 A1 | 5/2006 | Bromberg et al. |
| 2006/0102145 A1 | 5/2006 | Cohn et al. |
| 2006/0102146 A1 | 5/2006 | Cohn et al. |
| 2006/0180099 A1 | 8/2006 | Aimoto et al. |
| 2006/0191727 A1 | 8/2006 | Usami et al. |
| 2007/0028861 A1 | 2/2007 | Kamio et al. |
| 2007/0028905 A1 | 2/2007 | Shinagawa et al. |
| 2007/0034192 A1 | 2/2007 | Kamio et al. |
| 2007/0119391 A1 | 5/2007 | Fried et al. |
| 2007/0119411 A1 | 5/2007 | Kerns |
| 2007/0204813 A1 | 9/2007 | Arai et al. |
| 2007/0219679 A1 | 9/2007 | Coulmeau |
| 2007/0219701 A1 | 9/2007 | Hashimoto et al. |
| 2007/0221163 A1 | 9/2007 | Kamio |
| 2008/0046161 A1 | 2/2008 | Blumberg et al. |
| 2008/0053399 A1 | 3/2008 | Bromberg et al. |
| 2008/0092851 A1 | 4/2008 | Arakawa et al. |
| 2008/0156303 A1 | 7/2008 | Bromberg et al. |
| 2008/0173278 A1 | 7/2008 | Bromberg et al. |
| 2008/0288158 A1 | 11/2008 | Leone |
| 2009/0065409 A1 | 3/2009 | Kamio et al. |
| 2009/0159057 A1 | 6/2009 | Pursifull et al. |
| 2009/0178654 A1 | 7/2009 | Leone et al. |
| 2010/0006050 A1 | 1/2010 | Bromberg et al. |
| 2010/0024772 A1 | 2/2010 | Lewis et al. |
| 2010/0288232 A1 | 11/2010 | Bromberg et al. |
| 2011/0247586 A1 | 10/2011 | Zubeck et al. |
| 2012/0028758 A1 | 2/2012 | Stein |

FOREIGN PATENT DOCUMENTS

| | | |
|---|---|---|
| DE | 19954979 A1 | 6/2001 |
| EP | 1057988 B1 | 11/2006 |
| JP | 59068535 A | 4/1984 |
| JP | 61065066 | 4/1986 |
| JP | 62210229 A | 9/1987 |
| JP | 01195926 A | 8/1989 |
| JP | 02070968 A | 3/1990 |
| JP | 3111664 A | 5/1991 |
| JP | 5163976 A | 6/1993 |
| JP | 7019124 A | 1/1995 |
| JP | 2002227730 A | 8/2002 |
| JP | 2005146973 A | 6/2005 |
| JP | 2007056754 | 3/2007 |
| JP | 200882258 A | 4/2008 |
| RU | 2031238 C1 | 3/1995 |
| WO | 9739235 A1 | 10/1997 |
| WO | 2004097198 A1 | 11/2004 |
| WO | 2006023313 A2 | 3/2006 |
| WO | 2006055540 A1 | 5/2006 |
| WO | 2007106354 A2 | 9/2007 |
| WO | 2007106416 A2 | 9/2007 |

OTHER PUBLICATIONS

U.S. Appl. No. 60/746,507, filed May 5, 2006, Cohn et al.
U.S. Appl. No. 60/747,865, filed May 22, 2006, Heywood et al.
U.S. Appl. No. 60/948,753, filed Jun. 10, 2007, Bromberg et al.
U.S. Appl. No. 60/973,499, filed Sep. 19, 2007, Bromberg.
Australian examiner's first report on patent application No. 2007202600, Australian Government, IP Australia, Nov. 3, 2011, 2 pages.
Thomas G. Leone et al., "On-Board Water Addition for Fuel Separation System," U.S. Appl. No. 13/302,280, filed Nov. 22, 2011, 25 pages.
Donald J. Lewis et al., "Event Based Engine Control System and Method," U.S. Appl. No. 13/415,634, filed Mar. 8, 2012, 126 pages.
Office Action of Chinese Application No. 2006101484514, Issued Mar. 24, 2011, State Intellectual Property Office of PRC, 9 Pages.
Unknown Author, "Honda Making Significant Progress on HCCI Engine for Hybrid Application," http://www.greencarcongress.com/2005/10/honda_making_si.html, Oct. 28, 2005, 8 pages.
Kamio, J. et al., "Study on HCCI-SI Combustion Using Fuels Containing Ethanol," SAE Technical Papers Series No. 2007-01-4051, Powertrain & Fluid Systems Conference & Exhibition, Rosemont IL., Oct. 29-Nov. 1, 2007, 12 pages.
Cohn, D.R. et al., "Direct Injection Ethanol Boosted Gasoline Engines: Biofuel Leveraging for Cost Effective Reduction of Oil Dependence and CO2 Emissions," Mar. 15, 2005, Massachusetts Institute of Technology.
Bromberg, L. et al., "Calculations of Knock Suppressions in Highly Turbocharged Gasoline/Ethanol Engines Using Direct Ethanol Injector," Jul. 7, 2005, Massachusetts Institute of Technology.
Russ, Stephen, "A Review of the Effect of Engine Operating Conditions on Borderline Kick," SAE Technical Paper Series 960497, Feb. 26-29, 1996.
Brusca, S. et al., "Water Injection in IC-SI Engines to Control Detonation and the Reduce Pollutant Emissions," SAE Technical Paper No. 2003-01-1912, May 19-22, 2003.
Hunter, M. Park, "1962 Oldsmobile Jetfire," originally appeared in Special Interest Autos, Apr. 1996, http://www.tctc.com/~part/mph/pageCLIP/page62JET/62jet.htm, Nov. 7, 2006.

Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

ISA/UK, Intellectual Property Office Search Report of GB 0822341.4, Mar. 10, 2009, United Kingdom, 2 pages.

* cited by examiner

ON-BOARD FUEL VAPOR SEPARATION FOR MULTI-FUEL VEHICLE

CROSS REFERENCE TO RELATED APPLICATIONS

The present application is a divisional of U.S. patent application Ser. No. 11/955,246 filed Dec. 12, 2007, the entire contents of which are incorporated herein by reference for all purposes.

BACKGROUND AND SUMMARY

Internal combustion engines utilizing two or more different fuels have been proposed. As one example, the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. describe engines that are capable of using multiple fuels. Specifically, the Heywood et al. papers describe directly injecting ethanol into the engine cylinders to improve charge cooling effects, while relying on port injected gasoline to providing a majority of the combusted fuel over a drive cycle. The ethanol, in this example, can provide increased octane and increased charge cooling due to its higher heat of vaporization in comparison to gasoline, thereby reducing knock limits on boosting and/or compression ratio. This approach purports to improve fuel economy and increase utilization of renewable fuels.

The inventors of the present disclosure have recognized that requiring a user to re-fuel the engine system with two or more separate fuels (e.g., gasoline and ethanol), in order to achieve the advantages described by Heywood et al., can be burdensome. To address this issue, the inventors herein have provided a method of operating a fuel delivery system for a fuel burning engine of a vehicle. The method can include: separating a first fuel and a second fuel from a fuel vapor on-board the vehicle, said fuel vapor including at least an alcohol component and a hydrocarbon component and said first fuel including a higher concentration of the alcohol component than the fuel vapor and the second fuel; condensing the separated first fuel from a vapor phase to a liquid phase; delivering the condensed liquid phase of the first fuel to the engine; and combusting at least the condensed liquid phase of the first fuel at the engine.

By separating a fuel vapor into alcohol rich and hydrocarbon rich components, the benefits of increased engine performance and/or fuel economy can be realized without requiring the vehicle operator to refuel the vehicle with two or more separate fuels. Note that these fuel vapors may be generated on-board the vehicle from an initial liquid fuel mixture through the application of heat and/or vacuum. Additionally, fuel vapors may be generated from the fuel mixture during a refueling operation or during diurnal heating or cooling of the fuel system, even when the vehicle is not in use.

The inventors have further recognized that in one approach, separation of a fuel vapor can be achieved by passing the fuel vapor through an adsorption device that adsorbs a hydrocarbon component of the fuel vapor at a higher rate than an alcohol component. However, in other examples, separation of the fuel vapor can be achieved by passing the alcohol component of the fuel vapor through a selectively permeable membrane that transports the alcohol component of the fuel vapor at a higher rate than the hydrocarbon component.

Further still, the inventors have recognized that these fuel vapors may be separated using a batch processing approach, which can enable a more continuous fuel vapor separation operation where two or adsorption devices are utilized. As one example, the inventors have provided an engine system for a vehicle that includes: an internal combustion engine including an air intake passage; a fuel storage tank; an evaporator configured to receive a fuel mixture from the fuel storage tank via a fuel passage and to vaporize a higher volatility fuel from a lower volatility fuel contained in the fuel mixture; a vapor separation system including at least a first adsorption canister and a second adsorption canister arranged in parallel; a vapor passage fluidly coupling a vapor formation region of the evaporator with an inlet of each of the first and second adsorption canisters of the separation system; a fuel vapor purging passage fluidly coupling the air intake passage of the engine with an outlet of each of the first and second adsorption canisters; and a control system configured to: operate the evaporator to vaporize the higher volatility fuel from the lower volatility fuel; and during a first mode, pass the higher volatility fuel through the first canister to adsorb a hydrocarbon fraction of the higher volatility fuel at the first canister while purging fuel vapors from the second canister to the air intake passage of the engine; and during a second mode, pass the higher volatility fuel through the second canister to adsorb the hydrocarbon fraction of the fuel vapor at the second canister while purging fuel vapors including the hydrocarbon fraction adsorbed during the first mode from the first canister to the air intake passage of the engine.

By periodically operating at least one of the adsorption devices to retain hydrocarbons of the fuel vapor while purging at least one other adsorption device of previously stored hydrocarbons, a more continuous vapor separation process can be achieved.

DETAILED DESCRIPTION

Figure 1:
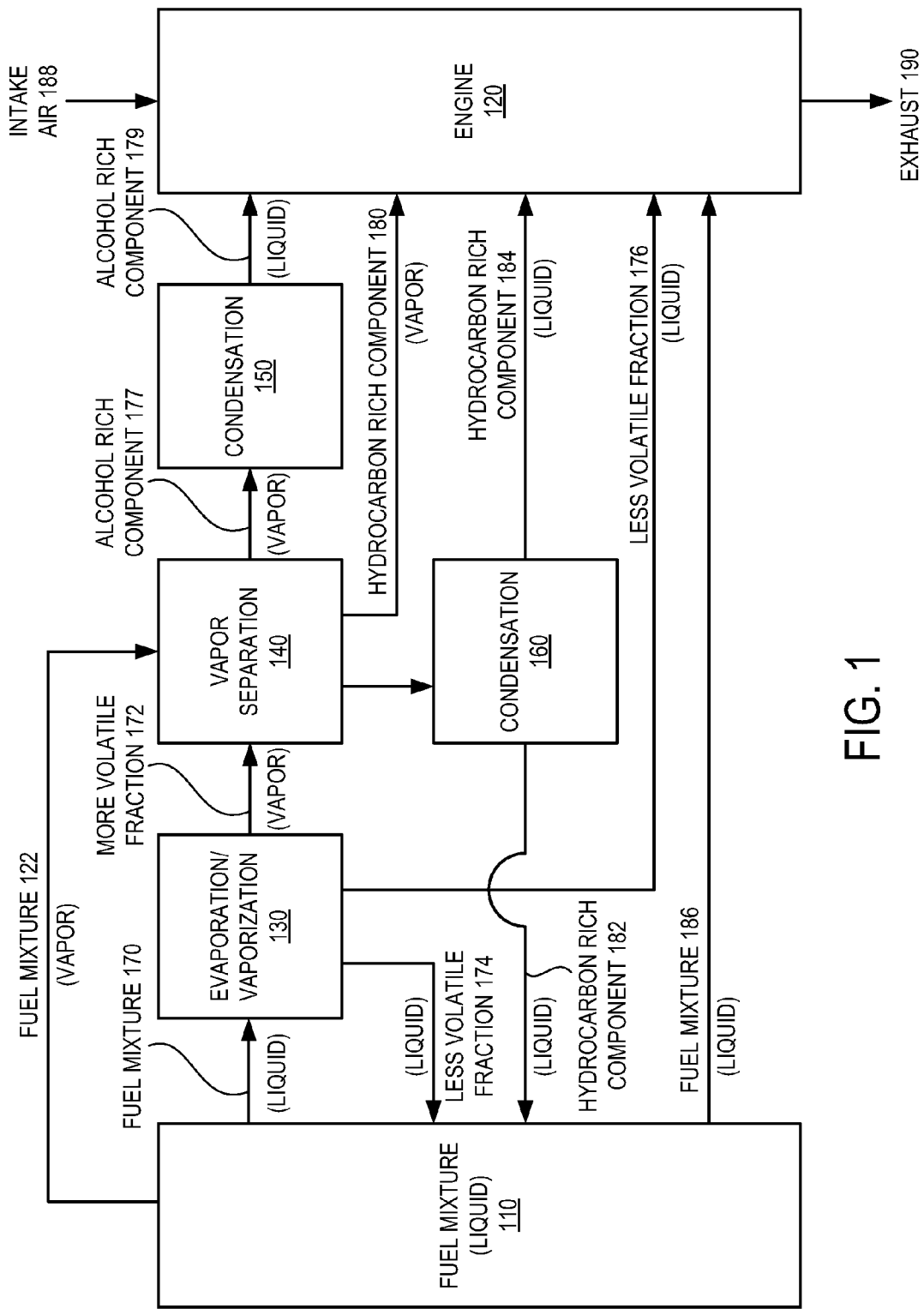
FIG. 1 shows a schematic depiction of an example fuel delivery process for an internal combustion engine.

FIG. 1 shows a schematic depiction of a fuel delivery process 100 for an internal combustion engine 120. As one example, engine 120 can be included in a vehicle propulsion system, which may further include a transmission. Note that the particular hardware enabling process 100 will be described in greater detail with reference to FIGS. 2-4.

Fuel delivery process 100 can provide for the separation of an alcohol fuel component from an initial fuel mixture on-board the vehicle. As one example, a portion of the initial fuel mixture having a higher volatility (e.g. higher vapor pressure) can be evaporated or vaporized by the application of heat to the fuel mixture and/or a partial vacuum at the vapor formation region or free surface of the liquid fuel mixture. An alcohol component of the more volatile vaporized portion of the fuel mixture can be separated from a hydrocarbon component by way of selective adsorption of the hydrocarbon component onto a solid or by way of a selective membrane that permits a greater transfer of the alcohol component than the hydrocarbon component of the fuel vapor. In this way, an alcohol rich fuel can be separated from the fuel mixture, where it can be provided to the engine in varying amounts relative to the remaining hydrocarbon rich fuel.

Fuel delivery process 100 can be performed with a fuel mixture 110 residing initially in a liquid phase at a fuel storage tank on-board the vehicle. As one example, fuel mixture 110 can include a mixture of a hydrocarbon fuel including gasoline or diesel and an alcohol fuel including ethanol and/or methanol.

Note that hydrocarbon based fuels such as gasoline and diesel may include various components. For example, gasoline may include a mixture of hydrocarbons, aromatics, olefins, cyclo-alkanes, and heteroatomic organic molecules. For purposes of clarity, when the term hydrocarbon component is used herein to distinguish a hydrocarbon based fuel such as gasoline or diesel from an alcohol based fuel such as ethanol or methanol, it should be appreciated that the hydrocarbon component can be accompanied by the aromatics, olefins, cyclo-alkanes, and/or heteroatomic organic molecules. As such, the various components that accompany the hydrocarbon component of the hydrocarbon based fuel portion of the fuel mixture can be described for purposes of clarity as simply hydrocarbons or the hydrocarbon component.

As indicated at 170, a liquid phase of the fuel mixture can be provided to an evaporation or vaporization stage as indicated at 130 to separate a higher volatility vapor fraction 172 (e.g. having a higher vapor pressure) from a lower volatility liquid fraction (e.g. having a lower vapor pressure) indicated at 174 or 176. The lower volatility liquid fraction that is separated from the higher volatility vapor fraction can have a higher octane rating than the original fuel mixture, where the lighter ends of the hydrocarbon component of the fuel mixture comprises at least a portion of the separated higher volatility vapor fraction.

Separation of the fuel mixture initially received via 170 may include heating the fuel mixture to separate the higher volatility fraction including at least alcohol and/or hydrocarbon component having a lower boiling temperature (e.g. higher vapor pressure) and/or higher evaporation rate from the lower volatility fraction including hydrocarbons having a higher boiling temperature (e.g. lower vapor pressure) and/or lower evaporation rate. For example, in addition to the alcohol vapors that are separated from the fuel mixture by evaporation or vaporization, the more volatile portion of gasoline may provide a mixture of vapors including butane, pentane, hexanes, and the aromatics such as benzene, toluene, and xylenes.

Therefore, it should be appreciated that the more volatile fraction of fuel mixture indicated at 172 may include some hydrocarbon vapors in addition to alcohol vapors. Furthermore, in some examples, a partial vacuum may be applied at the vapor formation region of the fuel mixture at 130 in order to increase the rate of evaporation of the more volatile fraction from the fuel mixture. The partial vacuum can be provided by a passage communicating with an air intake passage of the engine at a reduced area region of the intake passage or downstream of an intake throttle.

At 140, the more volatile fraction of the fuel mixture indicated at 172 can undergo additional separation as indicated at 140. As one example, a hydrocarbon component of the more volatile fuel fraction received via 172 can be separated from an alcohol component of the vapors as indicated at 178 and/or 180, in order to obtain an alcohol rich fuel component as indicated at 177. As one non-limiting example, separation of the alcohol component from the hydrocarbon component at 140 can be achieved by adsorbing the hydrocarbon component at a solid contained within an adsorption canister while permitting the alcohol component to pass through the canister without being adsorbed. As another non-limiting example, a selectively permeable membrane can be subjected to the more volatile fuel vapor fraction, whereby the membrane permits an exclusive or more rapid transport of the alcohol component through the membrane than the hydrocarbon component. Additionally, evaporative vapors indicated at 122 that originate from the initial fuel mixture 110 can also undergo separation without necessarily passing through the evaporation or vaporization process indicated at 130.

As described herein, an alcohol rich fuel component is a relative term that can refer to a first component of the fuel mixture that has a greater concentration of alcohol than a second component of the fuel mixture. Note that the term alcohol rich does not necessarily refer to a fuel that includes pure alcohol, but may also include some hydrocarbon components. Similarly, a hydrocarbon rich fuel component is another relative term that can refer to the second component of the fuel mixture that has a higher concentration of hydrocarbons than the first alcohol rich component. The term hydrocarbon rich also does not necessarily refer to a fuel that includes pure hydrocarbons, but may also includes some alcohol components.

The hydrocarbon rich component of the more volatile fraction of the fuel mixture can be provided to the engine in a vapor phase as indicated at 180 or can be condensed at 160 to obtain a liquid phase as indicated at 182 or 184. The hydrocarbon rich component that is condensed at 160, can be provided to the engine in liquid phase as indicated at 184. Alternatively, the liquid phase of the hydrocarbon rich component can be returned to fuel mixture 110 as indicated at 182.

The alcohol rich component of the more volatile fraction of the fuel mixture can be condensed at 150 into a liquid phase as indicated at 179, wherein it may be provided to engine 120. In each of condensation processes indicated at 150 and 160, the fuel vapor can be condensed to a liquid phase by increasing the temperature and/or pressure of the vapor. Additionally, fuel mixture 110 can be provided directly to the engine in a liquid phase as indicated at 186.

In this way, engine 120 can receive a plurality of different substances having different compositions and/or phases. However, in some examples, one or more of these substances may be omitted. For example, one or more of the substances indicated at 179, 180, 184, 176, and/or 186 can be omitted from the fuel delivery process. In at least one example, the alcohol rich component in liquid phase (e.g. 179), the hydrocarbon rich component in vapor phase (e.g. 180), and the hydrocarbon rich component in liquid phase (e.g. 184, 176, or 186) can be provided to the engine in varying relative amounts in response to operating conditions.

In some examples, where two or more different substances having different concentrations of alcohol are provided to the engine, separate fuel injectors may be used to independently deliver the fuels to the various cylinders of the engine. As one example, a first fuel injector can be used to provide an alcohol rich liquid fuel to a first location of the engine and a second fuel injector can be used to provide a hydrocarbon rich liquid fuel to a second location of the engine. For example, a first injector can be configured as a port injector for delivering a hydrocarbon rich fuel while a second injector can be configured as a direct injector for delivering an alcohol rich fuel. However, in some examples, a plurality of different liquid fuels can be provided to the engine via a common fuel injector by way of an intermediate mixing valve. Furthermore, fuel vapors (e.g. as indicated at 180) can be provided to the engine via a fuel vapor vent valve communicating with an air intake passage of the engine as will be described with reference to FIG. 6. Regardless of the particular manner in which these various fuels are provided to the engine, engine 120 can receive intake air from ambient as indicated at 188 which can be mixed with the fuel. This air and fuel mixture can be combusted in the various engine cylinders to produce a mechanical output and resulting exhaust gases indicated at 290.

Figure 2:
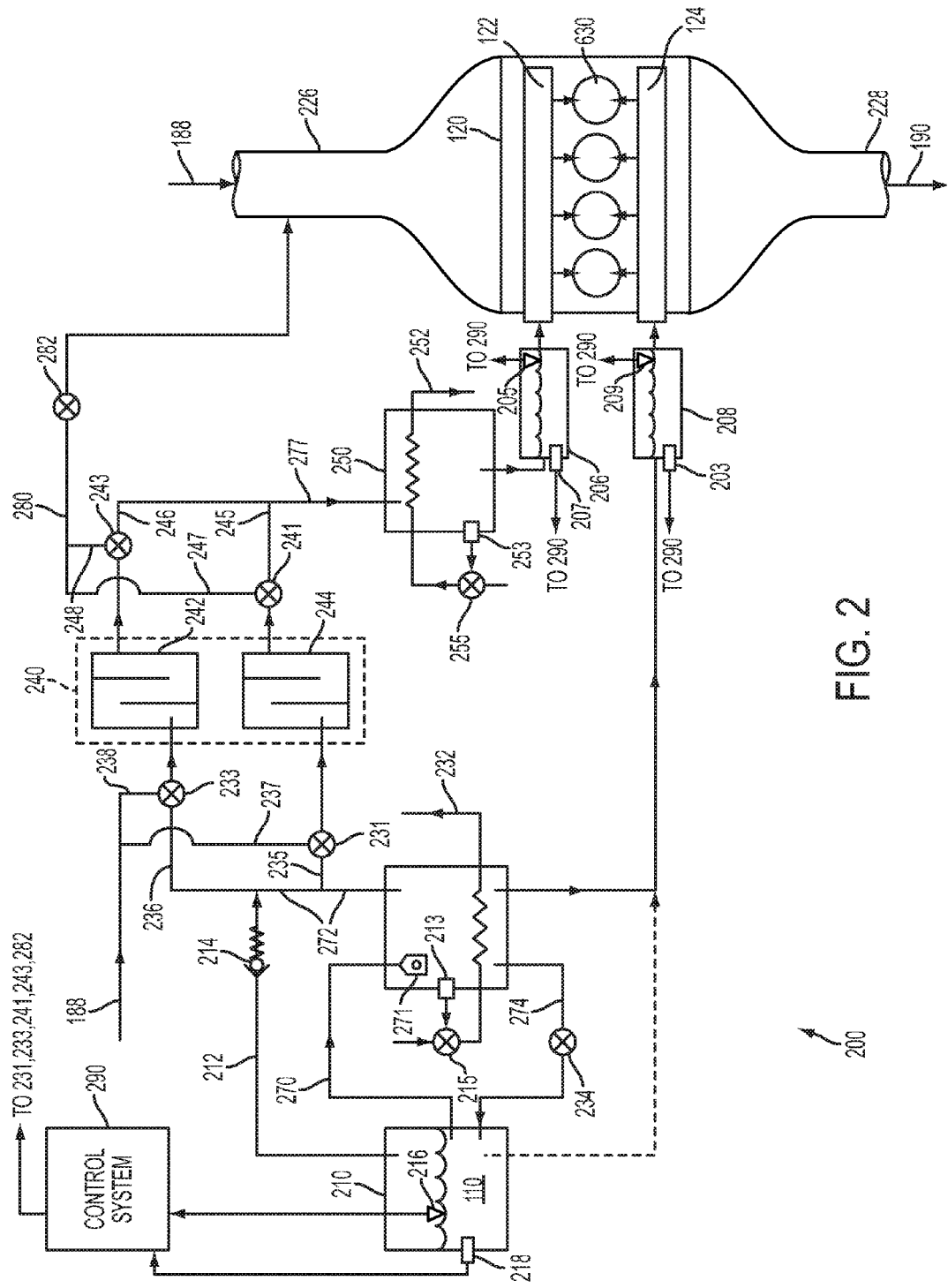
FIG. 2 shows a schematic diagram of an example of the fuel delivery system.

FIG. 2 shows an example fuel delivery system 200 including example hardware for implementing the fuel delivery process of FIG. 1. Fuel system 200 may include a fuel storage tank 210 which can be configured to store the liquid fuel mixture 110. Fuel storage tank 210 can include a fuel sensor 216 for providing to control system 290, an indication of the amount of fuel contained in fuel storage tank 210. Fuel storage tank 210 can also include a fuel sensor 218 for providing to control system 290, an indication of fuel composition.

Figure 9:
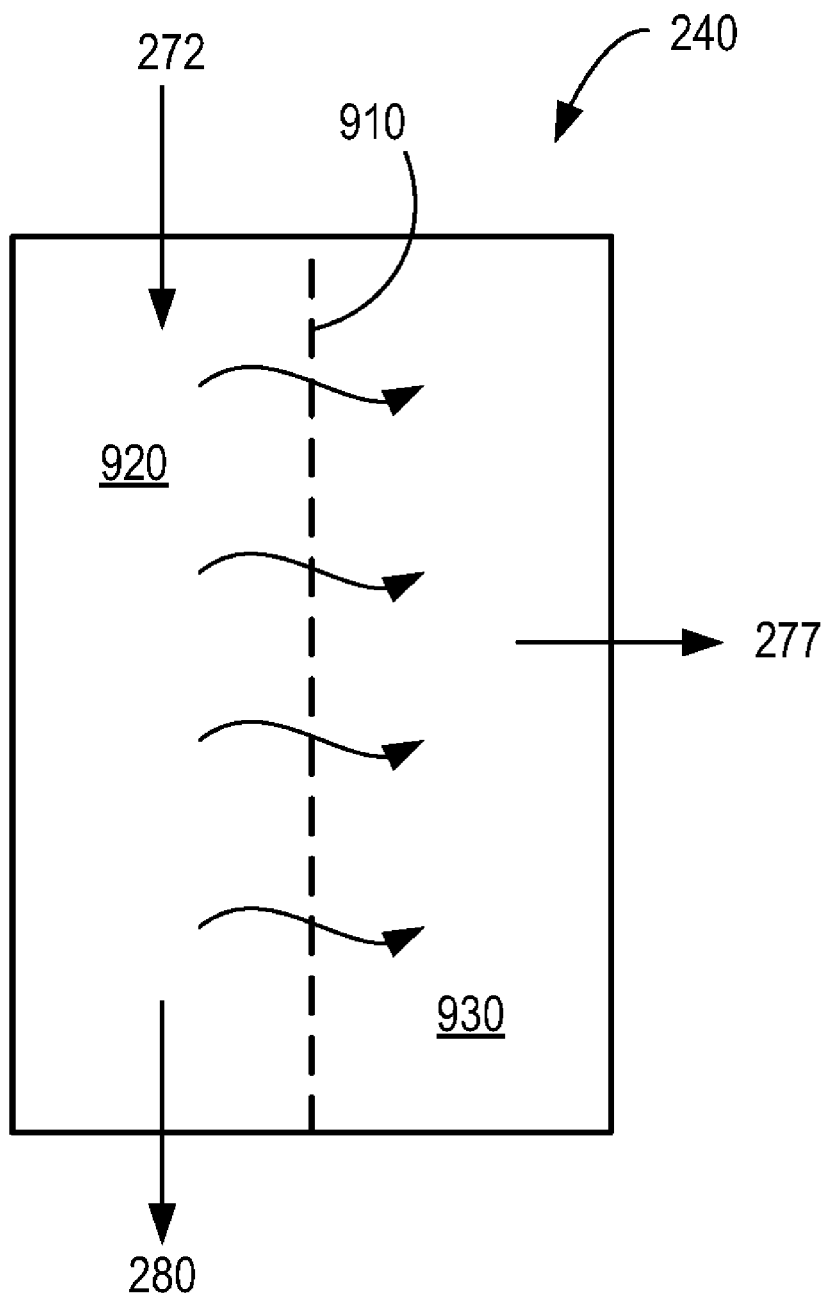
FIG. 9 shows a schematic depiction of an example separation device including a fuel separation membrane that selectively passes an alcohol component of the fuel at a higher rate than a hydrocarbon component.

In this particular example, fuel storage tank 210 can communicate with engine 120 via a plurality of fuel paths as previously described with reference to FIG. 1. For example, evaporative vapor 112 from the liquid fuel mixture stored in fuel storage tank 210 can proceed via fuel vapor passage 212 to a vapor separation system indicated at 240 where a hydrocarbon component can be removed from the fuel vapor by passing the evaporative vapors through one or more canisters 242 and 244, enabling the alcohol component to pass through vapor separation system 240. The hydrocarbon component can be removed from the fuel vapor by the canisters via adsorption of the hydrocarbons contained in the vapor onto a adsorption solid or other suitable material residing within the canisters. As one non-limiting example, to selectively strip gasoline components from the alcohols contained in the vapor, the vapors can be passed through the canisters including a bed of TENAX, carbon, or other suitable material, which has a low affinity for alcohols, but a high affinity for hydrocarbons and aromatics. The canisters can be periodically purged of their adsorbed components by exposing the canisters to a cooler gas, such as ambient air, which can cause the canisters to desorb the gasoline components. An alternative embodiment of vapor separation system 240 is shown in FIG. 9, which instead relies on a selectively permeable fuel separation membrane rather than adsorption onto a sold.

Fuel vapor passage 212 can include a unidirectional check valve shown schematically at 214 to reduce or inhibit the flow of fuel back into the fuel storage tank from passage 272. Fuel vapor passage 212 can be fluidly coupled with a fuel vapor formation region of the fuel storage tank, which may reside near an upper region (relative to the gravitational vector) of the storage volume defined by the fuel tank. In this way, fuel vapors originating from the fuel mixture during a re-fueling operation or during diurnal heating and cooling of the fuel mixture can be transferred to separation system 240, which is also configured to receive fuel vapors from evaporator 230.

The fuel mixture in a liquid state can be provided to fuel evaporator 230 via a fuel passage 270, whereby evaporation or vaporization of the more volatile fraction of the fuel mixture may be performed, as previously described with reference to 130, by application of heat and/or a vacuum. Fuel passage 270 can include a check valve 271 to reduce or inhibit the flow of fuel back into the fuel storage tank from evaporator 230. Evaporator 230 can communicate thermally with a heat source such as the engine coolant, exhaust system of the engine, or an electric heater, which is shown schematically at 232. Heat transferred from the heat source to the evaporator can be used to heat the fuel mixture to a suitable temperature to facilitate vaporization or evaporation of the more volatile fraction of the fuel mixture, including at least the alcohol component.

The temperature of the evaporator can be controlled by varying an operating parameter of the heat source (e.g. temperature or thermal energy power output) and/or the rate of heat transfer between the heat source and the fuel mixture in order to maintain the fuel mixture at a temperature that is less than a temperature where the heavier hydrocarbons contained in the fuel mixture are readily vaporized. As one example, the rate of heat exchange between the heat source and the fuel mixture can be adjusted by varying the flow rate of a working fluid provided to evaporator 230 via passage 232. For example, a thermostat indicated generally at 213 can provide an indication of fuel mixture temperature to a valve 215 for controlling the flow rate of the working fluid within circuit 232.

The liquid portion of the fuel mixture including the less volatile hydrocarbon fraction of the fuel (e.g. indicated as 174 in FIG. 1) can be returned to the fuel storage tank via fuel passage 274. Fuel passage 274 can include a valve 234, which may be adjusted by the control system to regulate the flow of fuel returning to the fuel storage tank. In some examples, fuel passage 274 may include a heat exchanger for reducing the temperature of the liquid fuel before it is returned to the fuel tank. In this way, additional increase in fuel temperature at the fuel tank can be reduced in the case where fuel is returned to the tank. Furthermore, in some examples, the less volatile portion of the fuel mixture, including at least the heavier hydrocarbons (e.g. indicated at 176 in FIG. 1) can be provided to the engine via a fuel passage 276.

The more volatile vapor portion of the fuel mixture including at least the alcohol component and potentially some lighter hydrocarbons (e.g. indicated at 172 in FIG. 1) can be provided to separation system 240 via a fuel vapor passage 272, which is fluidly coupled with a vapor formation region of evaporator 230. As depicted schematically in FIG. 2, fuel passages 274 and/or 276 can communicate with a lower region of the fuel evaporator (e.g. via a drain) and fuel vapor passage 272 can communicate with an upper region of the fuel evaporator, thereby improving the separation of the heavier liquid phase of the fuel mixture from the lighter vapor phase of the fuel mixture. Additionally, a vacuum can be applied at the evaporator via vapor passage 272 from intake manifold 226 to further assist in the removal of more volatile fuel vapors from evaporator 230. As one example, an intake throttle of the engine can be adjusted to vary the pressure within the intake passage of the engine, thereby varying the vacuum applied to the evaporator via passage 272.

The vapor phase of the fuel mixture generated at evaporator 230 can be provided to separation system 240 via one or more vapor passages communicating with passage 272. In this particular example, separation system 240 includes two adsorption canisters 242 and 244 that can communicate with fuel vapor passage 272 via passages 236 and 235, respectively. Air may be received from ambient as indicated at 188 and can be provided to passage 236 via air passage 238 and to passage 235 via air passage 237 for purging the canisters of stored hydrocarbons. A valve indicated at 233 can be adjusted by control system 290 to enable canister 242 to receive intake air via passage 238 or instead receive fuel vapors from the evaporator via passage 236. Similarly, a valve indicated at 231 can be adjusted by control system 290 to enable canister 244 to receive intake air via passage 237 or fuel vapor via passage 235. Valves 233 and 231 can include three-way valves or other suitable valves for enabling control system 290 to select which one of two flow paths are communicating with the adsorption canisters.

Depending on the positions of valves 243 and 241, canisters 242 and 244 can respectively communicate with condenser 250 via vapor passages 246 and 245, and can respectively communicate with purge passage 280 via vapor passages 248 and 247. As one non-limiting example, the control system can coordinate the adjustment of valves 231, 233, 241, and 243 to utilize a first canister of separation system 240 to remove the alcohol vapor component from the hydrocarbon vapor component, while a second canister of the separation system can be purged of the hydrocarbon component that has been stored at the second canister by adsorption.

Figure 3:
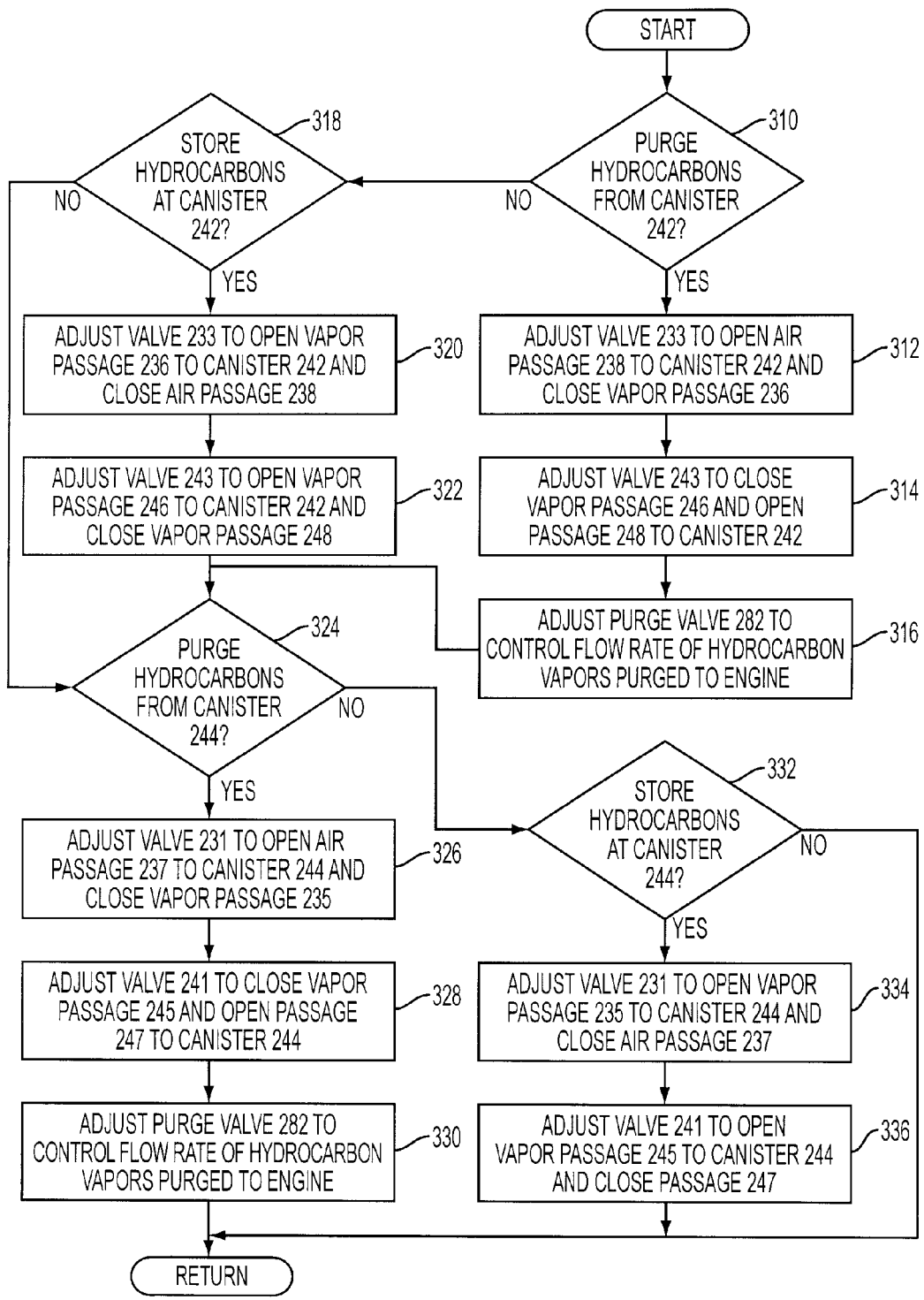
FIGS. 3 and 4 show flow charts depicting example control strategies for operating a fuel delivery system.

Referring also to FIG. 3, a flow chart depicting an example control strategy for operating separation system 240 will be described. If at 310, hydrocarbons are to be purged from canister 242, then the routine may proceed to 312. Otherwise, the routine can proceed to 318. For example, at 310, the control system may judge whether to purge hydrocarbons stored in canister 242. The control system may purge canister 242 in response to an indication of the amount of hydrocarbons contained in the canister relative to the hydrocarbon storage capacity of the canister. These indications may include: a period of time since a previous purge of the canister, an amount of alcohol that has passed through the canister since a previous purge, a temperature of the canister, a mass of the canister, and/or a pressure difference across the canister, etc.

For example, canisters 242 and 244 may include temperature sensors arranged upstream, downstream, or at the canister, and in communication with control system 290 to provide an indication of temperature. As another example, pressure sensors may be provided upstream and downstream of the canisters, which can communicate with control system 290 to provide an indication of pressure drop through the canisters.

Canister 242 may be purged of hydrocarbons by performing operations 312-314. At 312, valve 233 can be adjusted to open air passage 238 to canister 242 and close vapor passage 236. At 314, valve 243 may be adjusted to close vapor passage 246 and open passage 248 to canister 242. At 316, purge valve 282 can be adjusted to vary the flow rate of hydrocarbon vapors that are purged to the engine. In this way, the control system can operate separation system 140 so that canister 242 is purged of hydrocarbons by enabling air to flow from the ambient to the lower pressure of intake manifold 226 via canister 242, thereby carrying with it the stored hydrocarbon vapors.

If at 318, hydrocarbons are to be stored at canister 242, then the routine can proceed to 320. Otherwise, the routine can proceed to 324. For example, at 318, the control system may judge whether to store hydrocarbons at canister 242. As one example, the control system may store hydrocarbons at canister 242 if evaporator 230 is generating fuel vapors and/or canister 244 is nearing its hydrocarbon storage capacity or is conducting a purge. At 320, valve 233 can be adjusted to open vapor passage 236 to canister 242 and close air passage 238. At 322, valve 243 may be adjusted to open vapor passage 246 to canister 242 and close passage 248, thereby directing fuel vapors produced by the evaporator through canister 242 where the hydrocarbon component of the fuel vapors may be trapped and the alcohol component can proceed to condenser 250.

If at 324, hydrocarbons are to be purged from canister 244, then the routine may proceed to 326. Otherwise, the routine can proceed to 332. For example, at 324, the control system may judge whether to purge hydrocarbons stored in canister 244. The control system may purge canister 244 in response to an indication of the amount of hydrocarbons contained in the canister relative to the hydrocarbon storage capacity of the canister. As previously described with reference to canister 242, these indications may include: a duration of time since a previous purge of the canister, an amount of alcohol condensed from the fuel vapor passing through the canister, a temperature of the canister, a mass of the canister, and/or a pressure difference across the canister, etc.

Canister 244 may be purged of hydrocarbons by performing operations 326-330. At 326, valve 231 can be adjusted to open air passage 237 to canister 244 and close vapor passage 235. At 328, valve 241 may be adjusted to close vapor passage 245 and open passage 247 to canister 244. At 330, purge valve 282 can be adjusted to vary the flow rate of hydrocarbon vapors that are purged to the engine. In this way, the control system can operate separation system 140 so that canister 244 is purged of hydrocarbons by enabling air to flow from ambient to the lower pressure intake manifold of the engine via canister 244, thereby carrying with it the stored hydrocarbon vapors.

If at 332, hydrocarbons are to be stored at canister 244, then the routine can proceed to 334. Otherwise, the routine can return. For example, at 332, the control system can judge whether to store hydrocarbons at canister 244. As one example, the control system may store hydrocarbons at canister 244 if evaporator 230 is generating fuel vapors and/or canister 242 is nearing its hydrocarbon storage capacity or is conducting a purge. At 334, valve 231 can be adjusted to open vapor passage 235 to canister 244 and close air passage 237. At 336, valve 241 may be adjusted to open vapor passage 245 to canister 244 and close passage 247, thereby directing fuel vapors produced by the evaporator through canister 244 where the hydrocarbon component of the fuel vapors may be trapped and the alcohol component can proceed to condenser 250.

Figure 4:
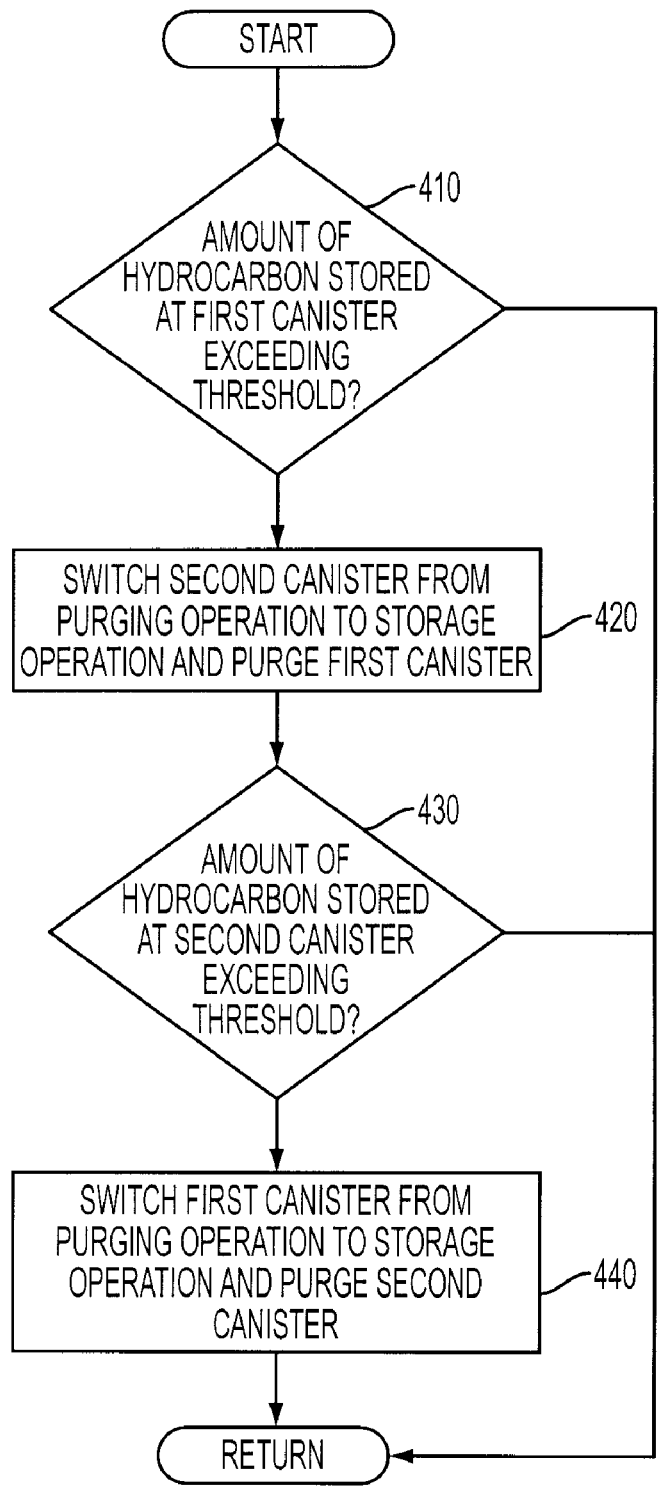

While FIG. 3 describes how canisters 242 and 244 can be operated to store or purge hydrocarbons, FIG. 4 describes how canisters 242 and 244 can be coordinated to enable batch processing of the fuel vapor mixture produced by the evaporator. At 410, if the amount of hydrocarbon fuel stored at the first canister is exceeding a storage threshold of the first canister, then the routine may proceed to 420. Otherwise, the routine may return where the first canister can continue to store the hydrocarbon fraction of the fuel mixture vapor while passing the alcohol component to the condenser. At 420, the second canister may be switched from the purging operation to the storage operation and the first canister can be purged of the stored hydrocarbons.

Continuing with FIG. 4, at 430, if it is judged that the amount of hydrocarbons stored at the second canister is exceeding a storage threshold of the second canister, then the routine may proceed to 440. Otherwise, the routine may return, where the second canister can continue to store the hydrocarbon component of the fuel mixture vapor while passing the alcohol component to the condenser. At 440, the first canister may be switched from the purging operation to the storage operation and the second canister may be purged of the stored hydrocarbons. In this way, evaporative fuel vapors produced by the evaporator and/or fuel storage tank can be passed through one of at least two adsorption canisters to remove hydrocarbons while the other canister is purging a batch of previously stored hydrocarbons to the engine. Note that in some examples, separation system 240 may include only a single adsorption canister.

Alcohol vapors (e.g. indicated as 177 in FIG. 1) that pass through separation system 240 via one or more canisters (or other suitable separation system) can be provided to condenser 250 by way of vapor passage 277 communicating with passages 245 and 246. Condenser 250 can be configured to condense alcohol vapor received from the separation system to a liquid state indicated at 179. The alcohol in the liquid state can be provided to the engine via a fuel passage 279. As one example, condenser 250 can be configured to increase the pressure and/or temperature applied to the alcohol vapor in order to promote condensation. Condenser 250 can receive a working fluid via cooling circuit 252 having a lower temperature than the alcohol vapor received from the separation system. For example, the working fluid may include ambient air or a refrigerant utilized by the on-board air conditioning unit. As yet another example, a thermoelectric cooling device may be utilized to cool the alcohol vapor at the condenser. A thermostat 253 can provide an indication of the temperature of the alcohol within condenser 250 to a valve 255 that regulates the flow of the working fluid through cooling circuit 252. As depicted schematically in FIG. 2, vapor passage 277 can communicate with an upper region of condenser 250 and fuel passage 279 for receiving the liquid alcohol can communicate with a lower region of condenser 250 (e.g. a drain) to promote separation of the vapor and liquid phases of the alcohol.

FIG. 2 provides an approach whereby a fuel mixture can be separated into a first fuel (an alcohol rich fuel) having a higher concentration of alcohol and a lower concentration of hydrocarbons than a second fuel (a hydrocarbon rich fuel). The first fuel including at least liquid alcohol (e.g. indicated as 179 in FIG. 1) can be provided to each of the engine cylinders via a first fuel injection system indicated generally at 222. The second fuel including at least the liquid hydrocarbons (e.g. indicated as 176, 184, or 186 in FIG. 1) can be provided to the each of the engine cylinders via a second fuel injection system indicated generally at 224.

Figure 6:
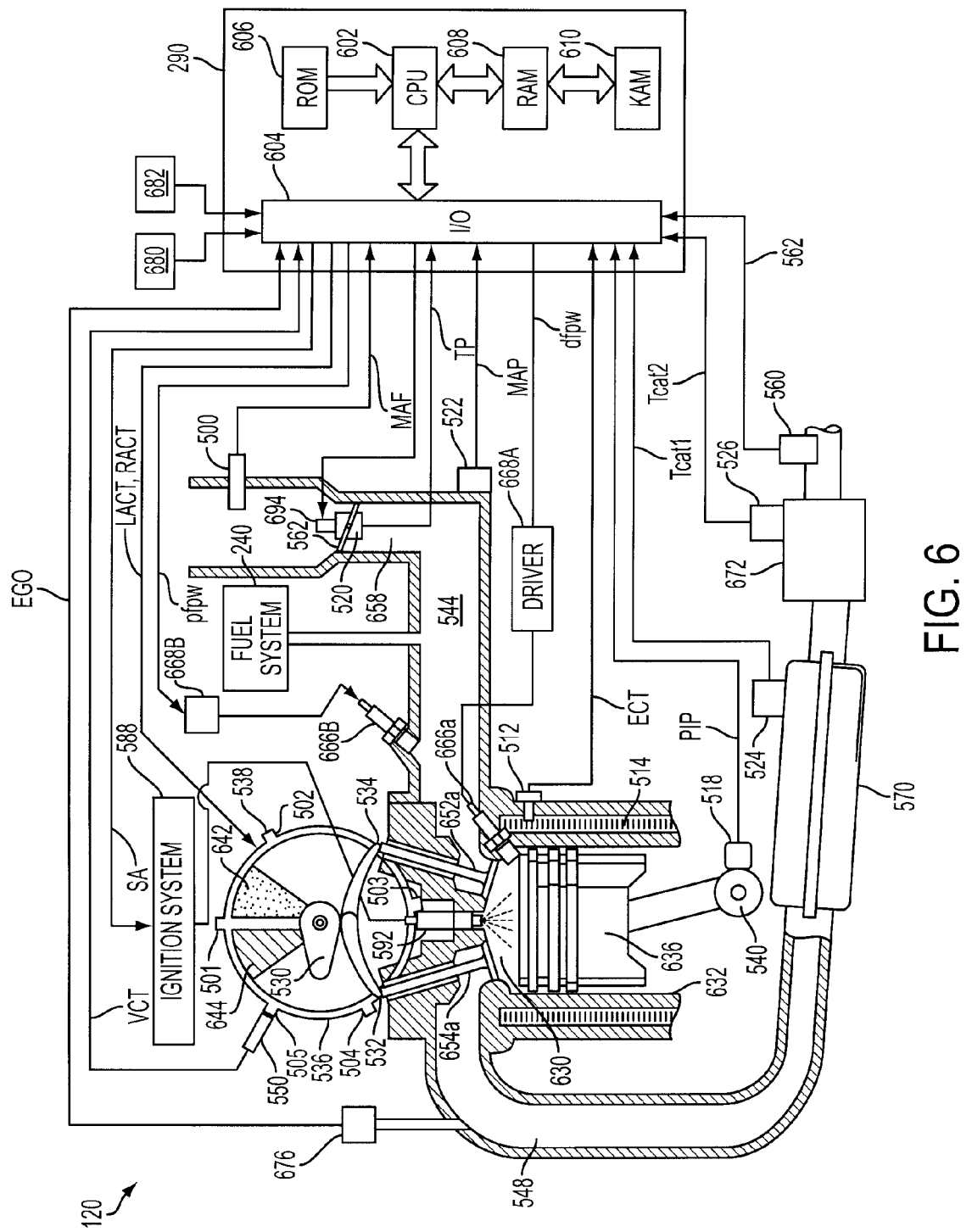

As one non-limiting example, fuel injection system 222 for the alcohol rich fuel may include an injector for each cylinder that is separate from an injector of fuel injection system 224 for the second fuel, as shown in FIG. 6. However, in other examples, the alcohol rich fuel and the hydrocarbon rich fuel can be combined at a single injector by way of a mixing valve to enable a mixture of the alcohol rich fuel and the hydrocarbon rich fuel to be provided to the engine in varying ratios. Regardless of how the alcohol rich fuel and the hydrocarbon rich fuel are provided to the engine, these fuels can be combusted to generate mechanical work and products of the combustion can be exhaust from the engine via exhaust passage 228.

Fuel delivery system 200 can include various fuel buffers to maintain a suitable supply of alcohol rich fuel and/or hydrocarbon rich fuel for use by the engine even during transient conditions. For example, a storage tank 206 may be provided along fuel passage 279 downstream of condenser 250 to store the alcohol rich fuel. Storage tank 206 may include a sensor 205 for providing an indication to control system 290 of the amount of alcohol rich fuel stored in tank 206. Tank 206 may also include a sensor 207 for providing an indication of the composition of the fuel stored in tank 206, including an indication of the concentration of alcohol in the alcohol rich fuel. In some examples, a storage tank 208 may be provided for the hydrocarbon rich fuel. Tank 208 can also include a sensor 209 for providing an indication of the amount of hydrocarbon rich fuel stored in tank 208 and/or a sensor 203 for providing an indication of the composition of the fuel stored in tank 208. In this way, the control system can identify the amount and/or composition of the alcohol rich fuel and the hydrocarbon rich fuel that are available to the engine. However, in some examples, storage tanks 206 and/or 208 may be omitted.

In response to an indication of a low availability of the alcohol rich fuel (e.g. when tank 206 is approaching an empty condition), for example, as provided by sensor 205, the control system can increase the rate of evaporation at evaporator 230, separation at separator 240, and/or condensation at condenser 250 to increase the separation rate of the alcohol fuel component from the hydrocarbon fuel component. Similarly, in response to an indication of a greater availability of the alcohol rich fuel (e.g. when tank 206 is approaching a full condition), the rate of evaporation, separation, and/or condensation may be reduced. The rate of fuel vapor generation can be increased by increasing the flow rate of the mixed fuel to the evaporator and/or by increasing the amount of heat provided to the evaporator via heating circuit 232. The rate of fuel vapor generation can be reduced by reducing the flow rate of the mixed fuel to the evaporator and/or by reducing the amount of heat provided to the evaporator via heating circuit 232. Similarly, the rate of condensation of the alcohol fraction can be increased or decreased by adjusting the flow rate of coolant flowing through condenser 250 via cooling circuit 252.

As yet another example, the control system can monitor the usage rate of each fuel type (e.g. via changes in fuel storage amount and/or fuel injector pulse width and injection frequency) and can adjust the processing rate (e.g. evaporation, separation, and condensation) of the fuel mixture accordingly to ensure that a sufficient amount of each fuel component is available to the engine.

As still another example, when the control system identifies that the fuel contained in fuel tank 210 includes an insufficient concentration of alcohol, for purposes of separating the fuel components, the control system may reduce or discontinue the various operations at evaporator 230, vapor separator 240, and/or condenser 250. For example, where the fuel contained in fuel tank 210 includes pure gasoline, the control system may shut-off evaporator 230 and condenser 250 to conserve energy. In this case, the fuel can be provided directly to the engine by way of passages 201 and 276, thereby bypassing the evaporator, separator, and/or condenser.

The control system can also effectuate increases or decreases in fuel flow rate, the flow rate of the working fluid flowing through circuit 232, and the flow rate of the working fluid flowing through circuit 252 by adjusting the operation of intermediate valves and/or pumps not shown in FIG. 2. For example, fuel passage 270 may include a fuel pump that is controllable by control system 290. As another example, fuel passages 276 and 279 can include fuel pumps for providing sufficient fuel pressure to the fuel injection systems. By increasing the pump work and/or pressure increase, the flow rate of fuel to the evaporator can be increased. By opening valve 232 or increasing the pump work provided to heating circuit 232, the flow rate of the working fluid may be increased. In this way, the control system can adjust various parameters of the fuel delivery system to meet the particular fuel consumption rate of the engine. Additionally, as depicted schematically at 201, a fuel bypass may be provided to couple fuel storage tank 210 with fuel passage 276 and/or hydrocarbon rich storage tank 208. Thus, under conditions where the evaporator is to be bypassed to at least some extent, the fuel mixture contained in tank 210 can be provided directly to the engine without requiring that it first pass through the evaporator. In response to the decision to bypass the evaporator and supplement the hydrocarbon rich fuel with the fuel mixture, the control system can reduce the amount of alcohol rich fuel delivered to the engine to account for alcohol already contained in the fuel mixture. Thus, a fuel composition sensor at fuel storage tank 210 or 208 can provide an indication to the control system of concentration of alcohol contained in the fuel injected by fuel injection system 224 and make appropriate adjustment to the amount of alcohol rich fuel delivered to the engine via fuel injection system 222. Fuel injection system 222 and 224 will be described in greater detail with reference to FIG. 6, whereby fuel injector 666A can receive fuel from fuel injection system 222 and fuel injector 666B can receive fuel from fuel injection system 224.

Figure 5:
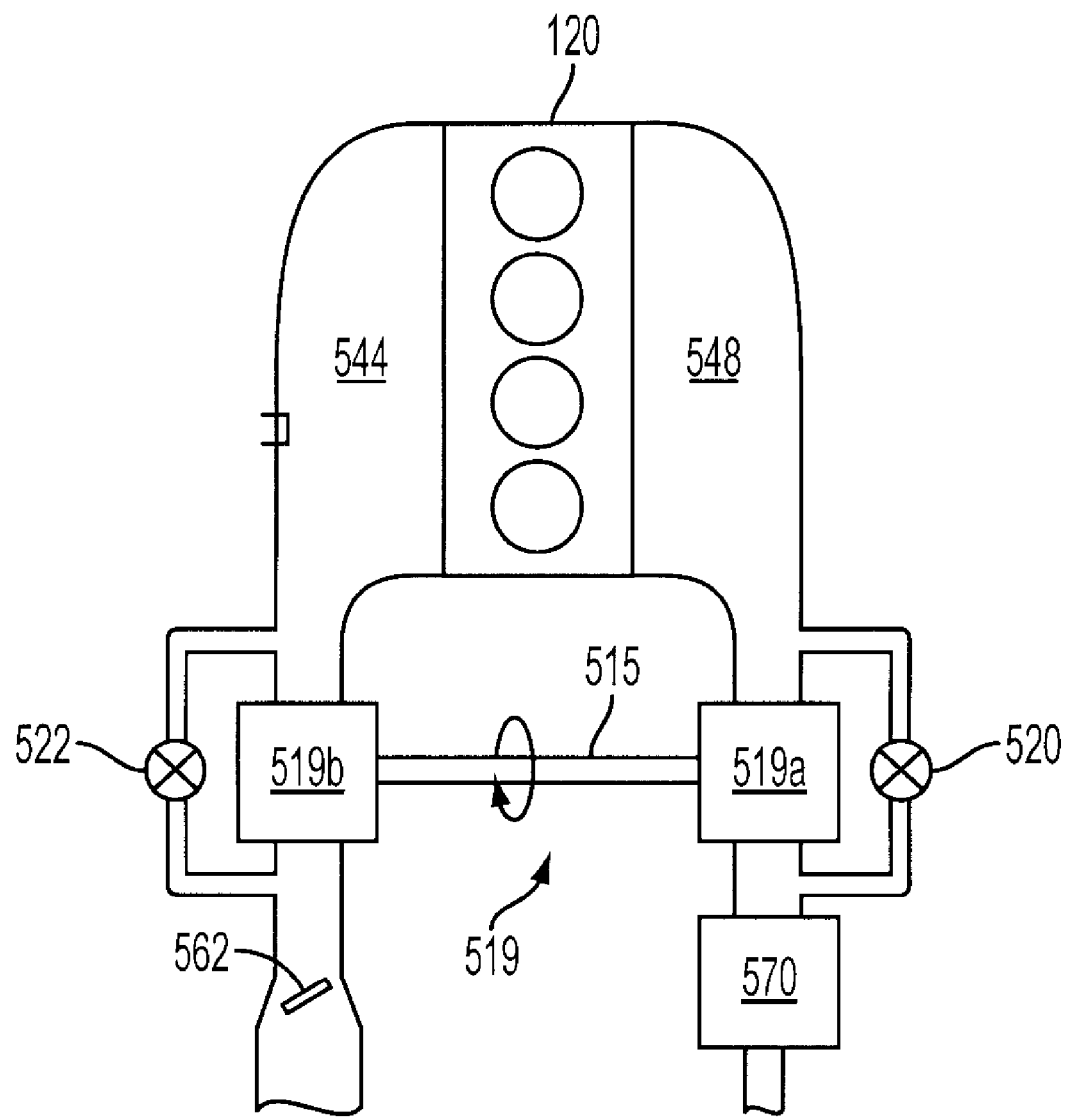
FIGS. 5 and 6 show an example engine system in greater detail.

FIGS. 5 and 6 provide a schematic depiction of engine 120 in greater detail. FIG. 6 shows an example cylinder of a multi-cylinder engine 120, as well as the intake and exhaust path connected to that cylinder. In the example embodiment shown in FIG. 6, engine 120 is capable of using two different fuels (e.g. an alcohol rich fuel and a hydrocarbon rich fuel) via two different injectors. For example, engine 120 may selectively utilize a hydrocarbon rich fuel including gasoline and an alcohol rich fuel including ethanol and/or methanol. In other embodiments, a single injector (such as a direct injector) may be used to inject a mixture of gasoline and an alcohol fuel, where the ratio of the two fuel quantities in the mixture may be adjusted by controller 290 via a mixing valve, for example.

Gasoline (or other hydrocarbon) and alcohol can be selectively used in varying relative amounts to take advantage of the increased charge cooling provided by the alcohol fuel (e.g., via direct injection) to thereby reduce the tendency of engine knock. This phenomenon, combined with increased compression ratio, boosting and/or engine downsizing, can then be used to obtain substantial fuel economy benefits by reducing the knock limitations on the engine.

FIG. 6 shows one example fuel injection system with two fuel injectors per cylinder, for at least one cylinder. However, each cylinder of the engine may also include two fuel injectors. The two injectors may be configured in various locations, such as two port injectors, one port injector and one direct injector (as shown in FIG. 6), or two direct injectors. Combustion chamber 630 of engine 120 is shown including combustion chamber walls 632 with piston 636 positioned therein and connected to crankshaft 640. A starter motor (not shown) may be coupled to crankshaft 640 via a flywheel (not shown), or alternatively direct engine starting may be used.

Combustion chamber, or cylinder, 630 is shown communicating with intake manifold 544 and exhaust manifold 548 via respective intake valves 652a and 652b (not shown), and exhaust valves 654a and 654b (not shown). Thus, while four valves per cylinder may be used, in another example, a single intake and single exhaust valve per cylinder may also be used. In still another example, two intake valves and one exhaust valve per cylinder may be used.

Combustion chamber 630 can have a compression ratio, which may be defined as the ratio of the volume of the combustion chamber when piston 636 is at bottom center to the volume of the combustion chamber when the piston is at top center. In one example, the compression ratio may be approximately 9:1, between 10:1 and 11:1, or between 11:1 and 12:1, or even greater.

Fuel injector 666A is shown directly coupled to combustion chamber 630 for delivering injected fuel directly therein in proportion to the pulse width of signal dfpw received from controller 290 via electronic driver 668A. While FIG. 6 shows injector 666A positioned at a side wall of cylinder, it may also be located overhead of the piston, such as near the position of spark plug 592. Such a position may improve mixing and combustion due to the lower volatility of some alcohol based fuels. Alternatively, the injector may be located overhead and near the intake valve to improve mixing.

The alcohol rich fuel may be delivered to fuel injector 666A by a high pressure fuel injection system 222 shown schematically in FIG. 2, also including a fuel tank, a fuel pump or pumps, and a fuel rail. As another example, the alcohol rich fuel may be delivered by a single stage fuel pump at lower pressure, in which case the timing of the direct fuel injection may be more limited during the compression stroke than if a high pressure fuel system were instead used.

Fuel injector 666B is shown coupled to intake manifold 444 in this example, rather than directly to cylinder 630. Fuel injector 666B can deliver the hydrocarbon rich fuel in proportion to the pulse width of signal pfpw received from controller 290 via electronic driver 668B as shown in FIG. 2 as fuel injection system 224. Note that a single driver 668 may be used for both fuel injection systems, or multiple drivers may be used. Fuel separation system 240 including one or more canisters for storing hydrocarbon vapors are also shown in schematic form communicating with intake manifold 544. Various fuel systems and fuel vapor purge systems may be used, such as those described below herein with regards to FIGS. 1 and 2, for example.

Intake manifold 544 is shown communicating with throttle body 658 via throttle plate 562. In this particular example, throttle plate 562 is coupled to electric motor 694 so that the position of elliptical throttle plate 562 may be controlled by control system 290 via electric motor 694. This configuration may be referred to as electronic throttle control (ETC), which can also be utilized during idle speed control. In an alternative embodiment (not shown), a bypass air passageway may be arranged in parallel with throttle plate 562 to control inducted airflow during idle speed control via an idle control by-pass valve positioned within the air passageway.

Exhaust gas sensor 676 is shown coupled to exhaust manifold 548 upstream of catalytic converter 570, where sensor 676 can correspond to various exhaust sensors. For example, sensor 676 may be suitable sensor for providing an indication of exhaust gas air/fuel ratio such as a linear oxygen sensor, a UEGO, a two-state oxygen sensor, an EGO, a HEGO, or an HC or CO sensor. In this particular example, sensor 676 is a two-state oxygen sensor that provides signal EGO to control system 290 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation.

Distributorless ignition system 588 selectively provides ignition sparks to combustion chamber 630 via spark plug 592 in response to spark advance signal SA from control system 290. Control system 290 may cause combustion chamber 630 to operate in a variety of different combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 666A during a compression stroke. In another example, a homogenous mixture may be formed by operating one or both of injectors 666A and 666B during an intake stroke (which may be open valve injection). In yet another example, a homogenous mixture may be formed by operating one or both of injectors 666A and 666B before an intake stroke (which may be closed valve injection). In still other examples, multiple injections from one or both of injectors 666A and 666B may be used during one or more strokes (e.g., intake, compression, exhaust, etc.). Even further examples may be where different injection timings and mixture formations are used under different conditions, as described below. Control system 290 can control the amount of fuel delivered by fuel injectors 666A and 666B so that the homogeneous, stratified, or combined homogenous/stratified air/fuel mixture in chamber 630 can be selected to be at stoichiometry, a value rich of stoichiometry, or a value lean of stoichiometry. Emission control device 672 is shown positioned downstream of catalytic converter 570. Emission control device 672 may be a three-way catalyst or a NOx trap, or a combination thereof.

Control system 290 is shown as a microcomputer, including microprocessor unit 602, input/output ports 604, an electronic storage medium for executable programs and calibration values shown as read only memory chip 606 in this particular example, random access memory 608, keep alive memory 610, and a conventional data bus. Control system 290 is shown receiving various signals from sensors coupled to engine 10, in addition to those signals previously discussed, including measurement of inducted mass air flow (MAF) from mass air flow sensor 500 coupled to throttle body 658; engine coolant temperature (ECT) from temperature sensor 512 coupled to cooling sleeve 514; a profile ignition pickup signal (PIP) from Hall effect sensor 518 coupled to crankshaft 640; and throttle position TP from throttle position sensor 520; absolute Manifold Pressure Signal MAP from sensor 522; an indication of knock from knock sensor 682; and an indication of absolute or relative ambient humidity from sensor 680. Engine speed signal RPM is generated by control system 290 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 518, which is also used as an engine speed sensor, produces a predetermined number of equally spaced pulses every revolution of the crankshaft.

In this particular example, temperature Tcat1 of catalytic converter 570 is provided by temperature sensor 524 and temperature Tcat2 of emission control device 672 is provided by temperature sensor 526. In an alternate embodiment, temperature Tcat1 and temperature Tcat2 may be inferred from engine operation.

Continuing with FIG. 6, a variable camshaft timing system is shown. Specifically, camshaft 530 of engine 120 is shown communicating with rocker arms 532 and 534 for actuating intake valves 652a, 652b and exhaust valves 654a, 654b. Camshaft 530 is directly coupled to housing 136. Housing 136 forms a toothed wheel having a plurality of teeth 138. Housing 136 is hydraulically coupled to crankshaft 40 via a timing chain or belt (not shown). Therefore, housing 536 and camshaft 530 rotate at a speed that can be the same as or a multiple of the crankshaft speed. However, by manipulation of the hydraulic coupling as will be described later herein, the relative position of camshaft 530 to crankshaft 640 can be varied by hydraulic pressures in advance chamber 642 and retard chamber 644. By allowing high pressure hydraulic fluid to enter advance chamber 642, the relative relationship between camshaft 530 and crankshaft 640 is advanced. Thus, intake valves 652a, 652b and exhaust valves 654a, 654b open and close at a time earlier than normal relative to crankshaft 640. Similarly, by allowing high pressure hydraulic fluid to enter retard chamber 644, the relative relationship between camshaft 530 and crankshaft 640 is retarded. Thus, intake valves 652a, 652b, and exhaust valves 654a, 654b open and close at a time later than normal relative to crankshaft 640.

While this example shows a system in which the intake and exhaust valve timing are controlled concurrently, variable intake cam timing, variable exhaust cam timing, dual independent variable cam timing, or fixed cam timing may be used. Further, variable valve lift may also be used and/or camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 538, being coupled to housing 536 and camshaft 530, allow for measurement of relative cam position via cam timing sensor 550 providing signal VCT to control system 290. Teeth 501, 502, 503, and 504 are preferably used for measurement of cam timing and are equally spaced (for example, in a V-8 dual bank engine, spaced 90 degrees apart from one another) while tooth 505 is preferably used for cylinder identification, as described later herein. In addition, control system 290 can send control signals (LACT, RACT) to conventional solenoid valves (not shown) to control the flow of hydraulic fluid either into advance chamber 642, retard chamber 644, or neither chamber.

Relative cam timing can be measured in a variety of ways. In general terms, the time, or rotation angle, between the rising edge of the PIP signal and receiving a signal from one of the plurality of teeth 538 on housing 536 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 560 may also provide an indication of oxygen concentration in the exhaust gas via signal 562, which provides control system 290 a voltage indicative of the O2 concentration. For example, sensor 560 can be a HEGO, UEGO, EGO, or other type of exhaust gas sensor. Also note that, as described above with regard to sensor 676 and sensor 560 can correspond to various different sensors.

FIG. 6 merely shows one cylinder of a multi-cylinder engine, and that each cylinder has its own set of intake/exhaust valves, fuel injectors, spark plugs, etc. For example, referring also to FIG. 5, engine 120 is shown having four in-line cylinders, however, engine 120 may have any suitable number of cylinders. Engine 120 may include a boosting device including a compression device such as turbocharger 519, which has a turbine 519a coupled in the exhaust manifold 548 and a compressor 519b coupled in the intake manifold 544. While FIG. 5 does not show an intercooler, one may optionally be included. Turbine 519a is typically coupled to compressor 519b via a drive shaft 515. Various types of turbochargers arrangements may be used. For example, a variable geometry turbocharger (VGT) may be used where the geometry of the turbine and/or compressor may be varied during engine operation by control system 290 to vary the boost pressure provided to engine 120. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 5 shows an example bypass valve 520 around turbine 519a and an example bypass valve 522 around compressor 519b, where each valve may be controller via control system 290 to vary the boost pressure that is provided to engine 120. In some examples, a twin turbocharger arrangement, and/or a sequential turbocharger arrangement, may be used. In the case of multiple adjustable turbocharger and/or stages, it may be desirable to vary a relative amount of expansion though the turbocharger, depending on operating conditions (e.g. manifold pressure, airflow, engine speed, etc.). Further, a supercharger may be used in still other examples.

Figure 7:
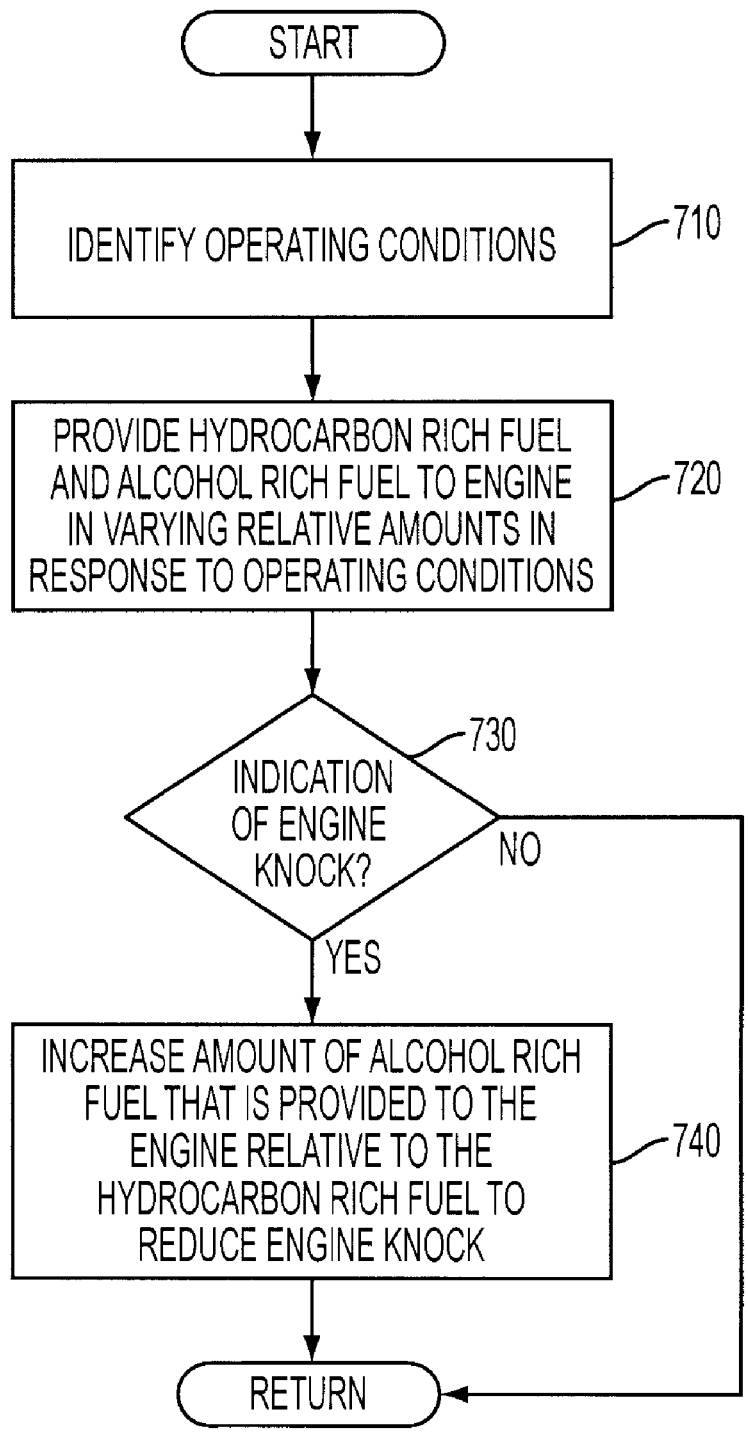
FIG. 7 shows a flow chart depicting an example control strategy for adjusting a relative amount of an alcohol rich fuel and a hydrocarbon rich fuel that are delivered to the engine.

FIG. 7 shows a flow chart depicting an example method for controlling the delivery of the alcohol rich fuel and the hydrocarbon rich fuel to the engine. At 710, operating conditions of the engine and fuel system may be identified. For example, the control system can obtain operating condition information from various sensors previously described. Operating conditions may include: engine speed, engine load, engine temperature, boost pressure, turbocharger conditions, ambient conditions, amount of separated and un-separated fuel stored on-board the vehicle, composition and amount of each fuel type available for delivery to the engine, requested engine performance by the operator (e.g. via an input received from an accelerator pedal), usage rate of each fuel type, among other operating conditions.

At 720, the hydrocarbon rich fuel and the alcohol rich fuel can be provided to the engine in varying relative amounts in response to the operating conditions identified at 710. For example, the control system can vary the amount of an alcohol rich fuel such as ethanol relative to the amount of a hydrocarbon rich fuel such as gasoline that are provided to the engine in response to operating conditions such as boost pressure provided by a boosting device, engine load, and engine speed, etc. The control system can also utilize an indication of the composition of the alcohol rich fuel and hydrocarbon rich fuel when selecting the relative amounts of each to be provided to the engine. For example, the control system can reduce the amount of the alcohol rich fuel that is provided to the engine relative to the hydrocarbon rich fuel, when the hydrocarbon rich fuel also includes some alcohol. Furthermore, the control system can adjust the amount of the alcohol rich fuel and the gasoline rich fuel that are provided to the engine so that a target air to fuel ratio is combusted in the engine cylinders.

As described with reference to FIG. 6, in at least some examples, the alcohol rich fuel can be provided directly to the engine cylinders via in-cylinder direct fuel injectors and the hydrocarbon rich fuel can be provided to the engine cylinders via a separate set of port injectors or alternatively via separate direct injectors. In still other examples, the hydrocarbon rich fuel and the alcohol rich fuel can be provided to each of the engine cylinders via a single in-cylinder direct injector that includes a mixing valve arranged upstream of the injector for adjusting the relative amounts of each fuel to be introduced by the injector.

At 730, if the operating conditions provide an indication of engine knock, then the amount of alcohol rich fuel that is provided to the engine relative to the amount of the hydrocarbon rich fuel may be increased at 740 to reduce or eliminate the engine knock. In some examples, the engine may include a knock sensor that is communicatively coupled with the control system for enabling the control system to response to an indication of engine knock by increasing the relative amount of alcohol that is delivered to the engine. Finally, the routine may return to the start.

Figure 8:
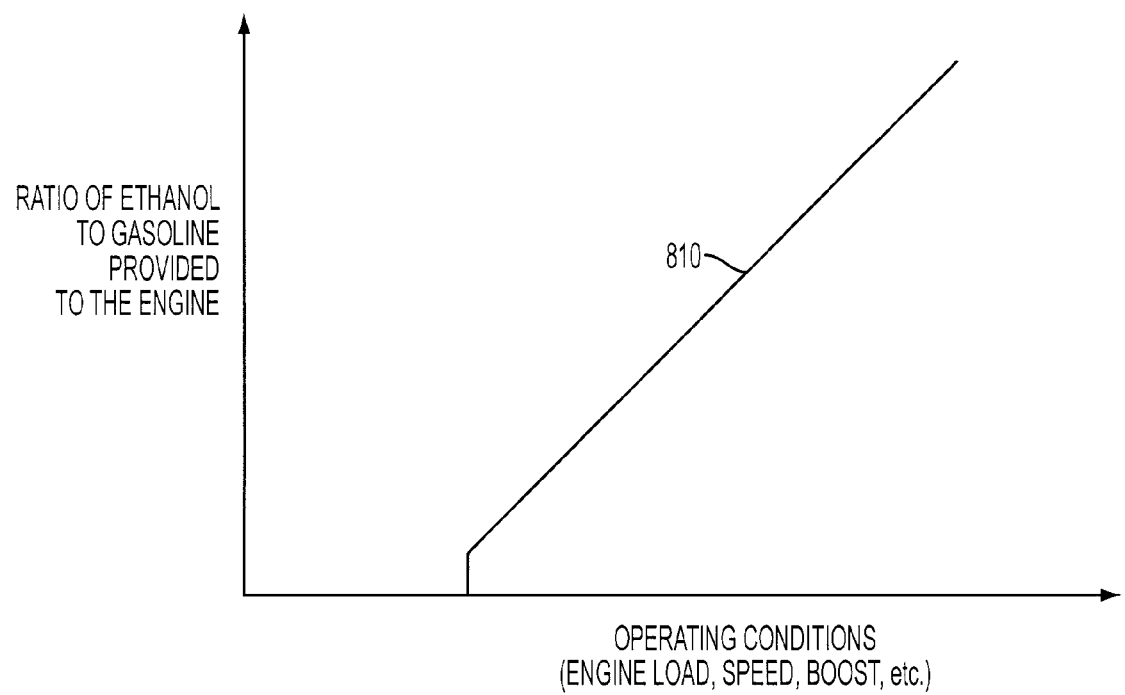
FIG. 8 shows a fuel control map for selecting the ratio of ethanol and gasoline that are provided to the engine.

FIG. 8 shows an example map that may be used by the control system for selecting the appropriate ratio of the alcohol rich fuel and the gasoline rich fuel in response to changing operating conditions. For example, as indicated at 810, the ratio of an alcohol rich fuel such as ethanol may be increased relative to a hydrocarbon rich fuel including gasoline in response to increasing engine load, engine speed, and engine boost, among other operating conditions that may affect engine knock. As one example, FIG. 8 represents a map that may be stored in memory at the control system.

FIG. 9 shows a schematic depiction of an alternative embodiment of separator 240 previously described with reference to FIG. 2. In this particular example, an alcohol component of the fuel vapor can be separated from the hydrocarbon component by way of a fuel separation membrane 910. Membrane 910 may include any suitable selectively permeable membrane that enables an alcohol component of the fuel to pass through the membrane at a different rate (e.g. a higher rate) than a hydrocarbon component. As one non-limiting example, membrane 910 may include NAFION or other suitable material. Membrane 910 segregates a first region of separator 920 from a second region 930. Due to the selectivity of membrane 910, the alcohol component of the fuel vapor, as received at region 920 via passage 272, can pass through membrane 910 and into region 930 at a higher rate than the hydrocarbon component. In some examples, the membrane may entirely exclude the hydrocarbon component from region 930. At least the alcohol component that passes through the membrane can be provided to condenser 250 via passage 277, while at least the hydrocarbon component of the fuel vapors can be provided to the intake manifold of the engine via passage 280. Note that fuel vapors can be received at vapor separator 240 from evaporator 230 via passage 272 or from fuel tank 210 by way of passage 212 fluidly coupled with passage 272.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system for a vehicle, comprising:
an internal combustion engine including an air intake passage;
a fuel storage tank;
an evaporator configured to receive a fuel mixture from the fuel storage tank via a fuel passage and to vaporize a higher volatility fuel from a lower volatility fuel contained in the fuel mixture;
a vapor separation system including at least a first adsorption canister and a second adsorption canister arranged in parallel;
a vapor passage fluidly coupling a vapor formation region of the evaporator with an inlet of each of the first and second adsorption canisters of the separation system;
a fuel vapor purging passage fluidly coupling the air intake passage of the engine with an outlet of each of the first and second adsorption canisters; and
a control system configured to:
operate the evaporator to vaporize the higher volatility fuel from the lower volatility fuel; and
during a first mode, pass the higher volatility fuel through the first canister to adsorb a hydrocarbon fraction of the higher volatility fuel at the first canister while purging fuel vapors from the second canister to the air intake passage of the engine; and
during a second mode, pass the higher volatility fuel through the second canister to adsorb the hydrocarbon fraction of the higher volatility fuel at the second canister while purging fuel vapors including the hydrocarbon fraction adsorbed during the first mode from the first canister to the air intake passage of the engine.

2. The system of claim 1, further comprising:
a first air passage fluidly coupling the inlet of the first canister to ambient;
a second air passage fluidly coupling the inlet of the second canister to the ambient;
a first valve system configured to be selectable between a first setting that opens the fluid coupling between the first air passage and the inlet of the first canister and closes the fluid coupling between the vapor passage and the inlet of the first canister, and a second setting that closes the fluid coupling between the first air passage and the inlet of the first canister and opens the fluid coupling between the vapor passage and the inlet of the first canister; and
a second valve system configured to be selectable between a first setting that opens the fluid coupling between the second air passage and the inlet of the second canister and closes the fluid coupling between the vapor passage and the inlet of the second canister, and a second setting that closes the fluid coupling between the second air passage and the inlet of the second canister and opens the fluid coupling between the vapor passage and the inlet of the second canister;
wherein the control system is configured to select the second setting for the first valve and the first setting for the second valve during the first mode and is configured to select the first setting for the first valve and the second setting for the second valve during the second mode.

3. The system of claim 2, further comprising:
a condenser configured to condense an alcohol fraction of the higher volatility fuel that passes through the vapor separation system to a liquid phase;
a first condenser passage fluidly coupling the outlet of the first canister with the condenser;
a second condenser passage fluidly coupling the outlet of the second canister with the condenser;
a third valve system configured to be selectable between a first setting that opens the fluid coupling between the outlet of the first canister and the first condenser passage and closes the fluid coupling between the outlet of the first canister and the fuel vapor purging passage, and a second setting that closes the fluid coupling between the outlet of the first canister and the first condenser passage and opens the fluid coupling between the outlet of the first canister and the fuel vapor purging passage; and
a fourth valve system configured to be selectable between a first setting that opens the fluid coupling between the outlet of the second canister and the second condenser passage and closes the fluid coupling between the outlet of the second canister and the fuel vapor purging passage, and a second setting that closes the fluid coupling between the outlet of the second canister and the second condenser passage and opens the fluid coupling between the outlet of the second canister and the fuel vapor purging passage;
wherein the control system is configured to select the first setting for the third valve and the second setting for the fourth valve during the first mode and is configured to select the second setting for the third valve and the first setting for the fourth valve during the second mode.

4. The system of claim 1, wherein the first canister and the second canister of the separation system are configured to selectively store the hydrocarbon fraction of the higher volatility fuel while enabling an alcohol fraction of the higher volatility fuel to pass through the vapor separation system.

5. The system of claim 4, wherein the control system is further configured to deliver the alcohol fraction of the higher volatility fuel and the lower volatility fuel to the engine in varying relative amounts in response to an operating condition; and further comprising a direct in-cylinder injector configured to deliver the alcohol fraction directly into a cylinder of the engine and a port injector configured to deliver the lower volatility fuel into the air intake passage of the engine upstream of the cylinder.

6. The system of claim 1 further comprising, a fuel vapor passage fluidly coupling a vapor formation region of the fuel storage tank with the inlet of the first and second canisters.

* * * * *